(12) United States Patent
Birtcher et al.

(10) Patent No.: US 7,796,022 B2
(45) Date of Patent: Sep. 14, 2010

(54) NOTIFICATION IN A VIRTUAL RECEPTIONIST METHOD AND SYSTEM

(76) Inventors: Brandon R. Birtcher, 18201 Von Karman Ave., Suite 1170, Irvine, CA (US) 92612; Andrew R. Shelansky, 347 Giotto, Irvine, CA (US) 92614; Brandon B. Stuut, 507 1/2 36th St., Newport Beach, CA (US) 92663

( * ) Notice: Subject to any disclaimer, the term of this patent is extended or adjusted under 35 U.S.C. 154(b) by 134 days.

(21) Appl. No.: 11/959,421

(22) Filed: Dec. 18, 2007

(65) Prior Publication Data
US 2009/0153335 A1 Jun. 18, 2009

(51) Int. Cl.
*G08B 23/00* (2006.01)
(52) U.S. Cl. .................. 340/502; 340/573.1; 340/573.4; 340/5.1; 340/5.2; 340/5.52; 340/5.8
(58) Field of Classification Search .................. 340/541, 340/573.1, 573.4, 565, 5.1, 5.2, 5.52, 5.8; 348/155, 156
See application file for complete search history.

(56) References Cited

U.S. PATENT DOCUMENTS

| | | | |
|---|---|---|---|
| 3,484,561 A | 12/1969 | Matthews | |
| 4,658,095 A | 4/1987 | Santiago | |
| 4,853,678 A | 8/1989 | Bishop, Jr. et al. | |
| 5,097,328 A | 3/1992 | Boyette | |
| 5,673,016 A * | 9/1997 | Lutes | 340/326 |
| 5,705,980 A | 1/1998 | Shapiro | |
| 5,828,294 A | 10/1998 | Shank | |
| 5,831,534 A | 11/1998 | Mooney et al. | |
| 6,179,206 B1 | 1/2001 | Matsumori | |
| 6,208,727 B1 | 3/2001 | Ganpaul et al. | |
| 6,529,723 B1 | 3/2003 | Bentley | |
| 6,535,132 B2 | 3/2003 | Waters et al. | |
| 6,591,094 B1 | 7/2003 | Bentley | |
| 6,959,389 B1 * | 10/2005 | Dunn et al. | 713/183 |
| 6,967,674 B1 | 11/2005 | Lausch | |
| 6,987,456 B2 * | 1/2006 | Kiel et al. | 340/573.3 |
| 7,065,196 B2 * | 6/2006 | Lee | 379/167.07 |
| 7,123,126 B2 * | 10/2006 | Tanaka et al. | 340/5.2 |
| 2003/0095184 A1 | 5/2003 | Lin | |

* cited by examiner

*Primary Examiner*—Daryl Pope
(74) *Attorney, Agent, or Firm*—Holme Roberts & Owen LLP

(57) ABSTRACT

A method of notification in a virtual receptionist system. The method begins by determining that a guest has arrived. The guest is determined without active participation from the guest. An alert is activated for each greeter in a plurality of greeters designated to greet guests. It is determined whether any greeter has acknowledged a corresponding alert. Thereafter, alerts corresponding to each greeter are de-activated when there is an acknowledgment.

20 Claims, 7 Drawing Sheets

NOTIFICATION IN A VIRTUAL RECEPTIONIST METHOD AND SYSTEM

RELATED APPLICATIONS

This application is related to co-pending application U.S. application Ser. No. 11/959,393, entitled "Virtual Receptionist Method and System," to Birtcher et al., filed on Dec. 18, 2007, the body of which is herein incorporated in its entirety by reference.

BACKGROUND OF THE INVENTION

1. Field of Invention

The present invention relates to the field of virtual receptionist systems. Specifically, the present invention relates to the automated process of receiving guests and providing notification of the arrival of the guest.

2. The Relevant Technology

Many businesses include a separate lobby in which to receive guests or visitors. Typically, the guest would enter the lobby and be greeted by a receptionist that is able to determine what the guest needs. For example, a receptionist is able to effectively bring together the guest and the person with whom the guest is visiting.

In a large business, the receptionist would be kept busy greeting a steady flow of guests coming into the lobby. For extremely busy lobbies, more than one receptionist would be employed. As such, the receptionist is dedicated to the task of greeting and assisting guests that come into the lobby. In addition, other tasks may be assigned to the receptionist, depending on the frequency of the incoming guests. For example, the receptionist may be tasked to take incoming calls, or to perform other minor administrative duties that would enable the receptionist to remain in the lobby in order to still greet guests.

On the other hand, smaller businesses may not have the guest traffic needed to employ a full-time receptionist to monitor the lobby. That is, most of the time, the receptionist is waiting for a guest to arrive within the lobby. To fill in the time, the receptionist typically performs minor tasks that could tolerate interruption and that would also enable the receptionist to remain in the lobby. However, the receptionist is limited in what tasks he or she could accomplish. The receptionist probably could not take on more complicated tasks since this may require desk space holding multiple documents or the handling of sensitive documents, both of which are unnecessary for an incoming guest to view.

As an alternative, some small businesses leave the lobby unattended and hope that the guest is able to actively seek out assistance. For example, the guest would enter the unattended lobby, determine the proper procedures for notifying the business of their arrival, or even find their way through the lobby and into an adjacent area where secretaries or other employees might notice or greet them. While this allows the business to eliminate a receptionist, it requires that the guest perform some action in order to receive assistance. In addition, the incoming guest may feel unwelcome in an unattended lobby as he or she is trying to determine first if the business is open, and second just what is the proper process is for obtaining assistance. While the majority of guests eventually will gain assistance, arguably some good will of the business is lost while the guest is left wondering what to do.

Additionally, many larger retail stores are concerned that customers may not be receiving the proper service. Although the retail store has many customer service representatives working the floor, as for a warehouse retailer, it may seem to customers that none are available when the customer needs immediate attention. The customer may wander the retail store aimlessly until he or she happens upon a customer representative, or worse the customer may leave the retail store feeling as if their needs were not addressed. In either case, the customer arguably will be dissatisfied with the service they received, and may give their business to another retailer.

SUMMARY OF THE INVENTION

A method of notification in a virtual receptionist system. The method begins by determining that a guest has arrived. The guest is determined without active participation from the guest. Specifically, the method determines that a guest has arrived based on passive interactions of the guest with a guest detection system. An alert is activated for each greeter in a plurality of greeters designated to greet guests. It is determined whether any greeter has acknowledged a corresponding alert. Thereafter, alerts corresponding to each greeter are de-activated when there is an acknowledgment from any greeter.

In another embodiment, a method of notification in a virtual receptionist system is disclosed for implementation within a retail establishment. The method determines that a customer needs assistance at a location within the retail establishment. Then, a subset of a plurality of assistance providers is determined. The plurality of assistance providers is designated to provide service to customers. The subset of assistance providers satisfies at least one condition. Once the subset is determined, an alert is activated for each of the subset of assistance providers. Then, it is determined whether any of the subset of assistance providers has acknowledged a corresponding alert. Thereafter, alerts corresponding to each of the subset is de-activated, if there is such an acknowledgment from any of the subset of assistance providers.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION OF THE PREFERRED EMBODIMENTS

Figure 1A:
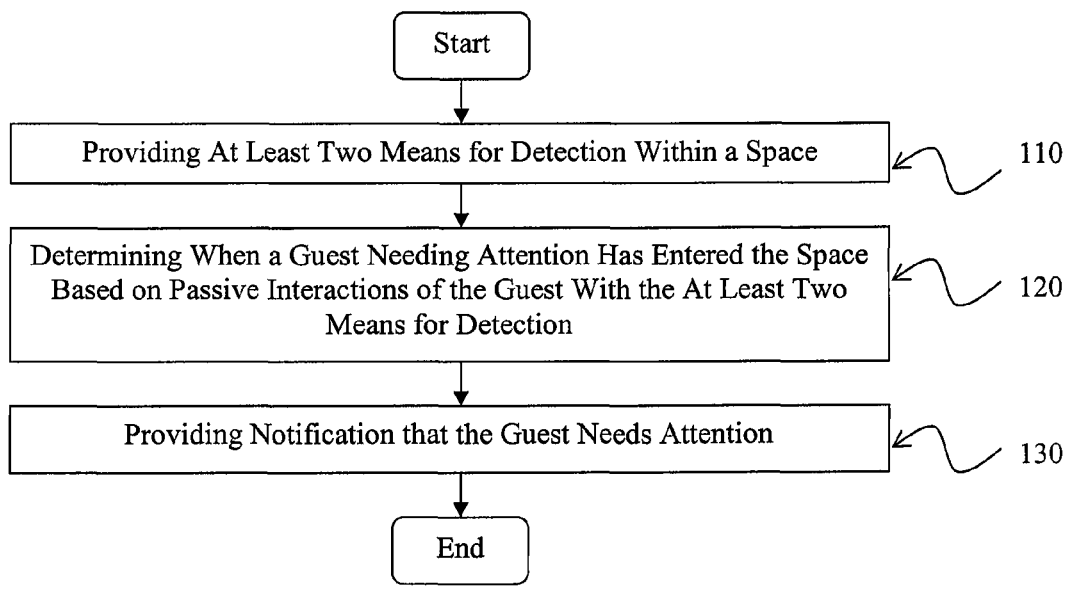
FIG. 1A is a flow diagram illustrating a method for detecting when a guest has arrived, in accordance with one embodiment of the present invention.

Reference will now be made in detail to the preferred embodiments of the present invention, a method and system for providing notification of the arrival of a guest. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Accordingly, embodiments of the present invention provide for a virtual receptionist system that automatically provides notification that a guest needing attention has arrived in a reception area without any active participation by the guests themselves. More particularly, the virtual receptionist system that promptly recognizes the arrival of guests also provides notification that the guest has arrived. As such, the virtual receptionist system allows better economic use of employees without dedicating resources to meeting and greeting infrequent guests.

Notation and Nomenclature

Embodiments of the present invention can be implemented on software running on a computer system. The computer system can be a personal computer, notebook computer, server computer, mainframe, networked computer, handheld computer, personal digital assistant, workstation, and the like. For example, a virtual receptionist software program that provides notification of the arrival of guests is centrally managed by a computer running a custom software application, in one embodiment. In another embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "sending," and "activating," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

The Virtual Receptionist System

Embodiments of the present invention provide services related to a virtual receptionist system. The virtual receptionist system provides, among other features, the ability to automatically detect the arrival of a guest and provide notification to greeters that the guest has arrived. Various examples of a virtual receptionist system that detects the arrival of a guest is illustrated in the co-pending application with Ser. No. 11/959,393, entitled "Virtual Receptionist Method and System," to Birtcher et al., filed on Dec. 18, 2007, the body of which is herein incorporated in its entirety by reference.

Figure 1B:
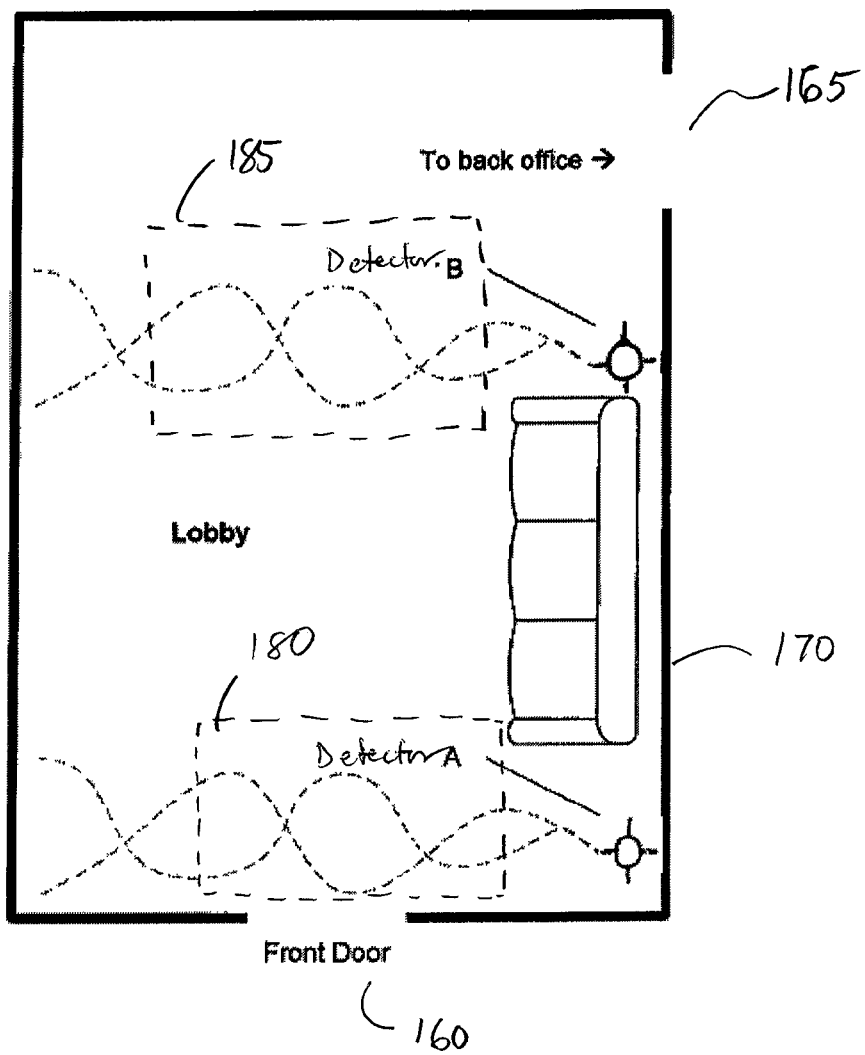
FIG. 1B is an illustration of a configuration of detectors used in a virtual receptionist system that is capable of detecting when a guest has arrived, in accordance with one embodiment of the present invention.

FIGS. 1A and 1B in conjunction provide exemplary illustrations of a method and system for a virtual receptionist that is capable of detecting when a guest has arrived and providing notification that the guest has arrived, in accordance with embodiments of the present invention. The virtual receptionist system as implemented in FIGS. 1A and 1B is intended to automate the process for detecting, greeting and meeting guests. It is intended that the configuration of the virtual receptionist system illustrated in FIG. 1B can be modified to provide the detection of guests in a variety of environments, in other embodiments of the present invention.

Specifically, FIG. 1A is a flow diagram 100A illustrating a method for reception, in accordance with one embodiment of the present invention. The method as implemented minimizes the need to employ a full-time receptionist to monitor a reception area. In that manner, the method of flow diagram 100A can be implemented as a virtual receptionist that is capable of recognizing a guest has arrived and promptly greeting that guest.

In particular, the method of flow diagram 100A begins at 110 by providing at least two means for detection within a space. In one embodiment, the space is the reception area. In another embodiment, the space includes the reception area, and in still another embodiment, the space includes at least a portion of the reception area.

The detection means includes any type of sensor or mechanism that is able to recognize the presence of an object within a particular region. For instance, the detection means includes motion detection sensors (e.g., infrared detection sensors), laser detection sensors, pressure detection sensors, comparative video detection systems, other comparative detection systems, etc.

At 120, the present embodiment continues by determining when a guest needing attention has entered the space. For instance, a system of motion sensors is implemented to recognize new guests, and to distinguish between people entering the lobby and people leaving the lobby, in one embodiment. More particularly, detection means within the space are configured such that the passive interactions of a guest with the detection means can be interpreted to determine that a guest needing attention has arrived within a reception area.

In various embodiments of the present invention, a guest needing attention is recognized without any active participation on the part of the guest. However, other embodiments of the present invention are well suited to providing a determination that a guest needing attention has arrived through the active participation of the guest, such as recognizing a prompt from a guest that he or she needs assistance. In still other embodiments, once a guest is recognized, the guest may be prompted for further information. For instance, the guest may be prompted to provide the name of the person he or she is to visit.

At 130, a notification is provided that a guest needing attention has arrived. More particularly, after a determination is made that a guest needing attention has arrived within a reception area, a notification is provided to one or more greeters designated to greet guests that the guest needs attention. In this manner, a full-time employee need not be dedicated to monitoring the reception area for the entry of guests, and instead, the method of flow diagram 100 can be implemented for automatically recognizing that a guest entering the reception area needs attention and providing notification that the guest has arrived.

FIG. 1B is an illustration of an exemplary configuration of detectors in a space defining the reception area 150, in accordance with one embodiment of the present invention. In one embodiment, the configuration of FIG. 1B can be used to describe the functionality of a virtual receptionist system.

While the embodiment shown in FIG. 1B provides guest detection using uses two detection means, other configurations using additional detectors may provide significantly increased accuracy in determining for various environments whether a guest has arrived and needs assistance. For example, two or more detection means can be divided into two groups. That is, one or more detection means are grouped in Group A, and one or more detection means are grouped into Group B. Each additional detection means in a group allows for detection in a variety of environments, and also can provide added functionality, such as directional information. In other embodiments, the detection means can be divided into more than two groups. Each additional grouping of detection means can provide additional functionality, such as tracking of individuals within a reception area.

The configuration shown in FIG. 1B includes two detectors: detector A and detector B. Detector A monitors the region 180 surrounding the front door 160 of the reception area 150. As described previously, detectors A and B are representative of any number of detection means (e.g., infrared sensors, laser sensors, pressure sensitive sensors, etc.). For example, in one embodiment, detector A is a motion sensor that is mounted on the wall 170 just inside the reception area 150. Detector A is pointed perpendicular to the direction a person would walk through the entryway defined by the front door 160 (e.g., parallel with the front door 160). As such, detector A is able to detect when an object (e.g., person) enters region 157.

Detector B monitors the region 185, which defines an interior area some distance from the front door 160 of the reception area 150. Detector B can be mounted on wall 170. As shown, regions 180 and 185 define distinct regions within reception area 150.

The information obtained from detectors A and B are sent to a guest determinator of a virtual receptionist system that determines if a guest has arrived. The virtual receptionist system 300 is able to apply a set of logical rules to determine the meaning of various detector activities. For instance, different combinations of detectable events will represent a guest arriving, an employee arriving, a person (guest or employee) leaving, or a person pacing in the lobby.

For example, if detector A is triggered, and detector B is triggered within a time period (e.g., 4 seconds), this would indicate that an employee is walking through the reception area to access the back office through interior door 165. The employee typically would not linger within the reception area 150, and would deliberately walk to the interior door 165 through the second region 185.

In addition, if detector A is triggered, but detector B is not triggered within the same time period (e.g., 4 seconds), this would indicate that a guest is in the reception area 150. The guest would not typically walk to the interior door 165 to access the back office, but would instead linger in the reception area 150 waiting for assistance.

As a further example, if detector B is triggered first, and then detector A is triggered within a time period (e.g., 15 seconds), this indicates that someone is leaving the office. In this situation, the present embodiment is able to distinguish a person leaving the reception area 150 from a person entering the reception area 150 and possibly needing assistance. As such, in this situation notification is not provided even if detector A is triggered.

In addition, if detector B is triggered, and detector A is not triggered within a time period (e.g., 15 seconds), then a person either has moved from inside the office to the reception area 150, or from the reception area 150 to the back office through the interior door 165.

Notification in a Virtual Receptionist System

Figure 2:
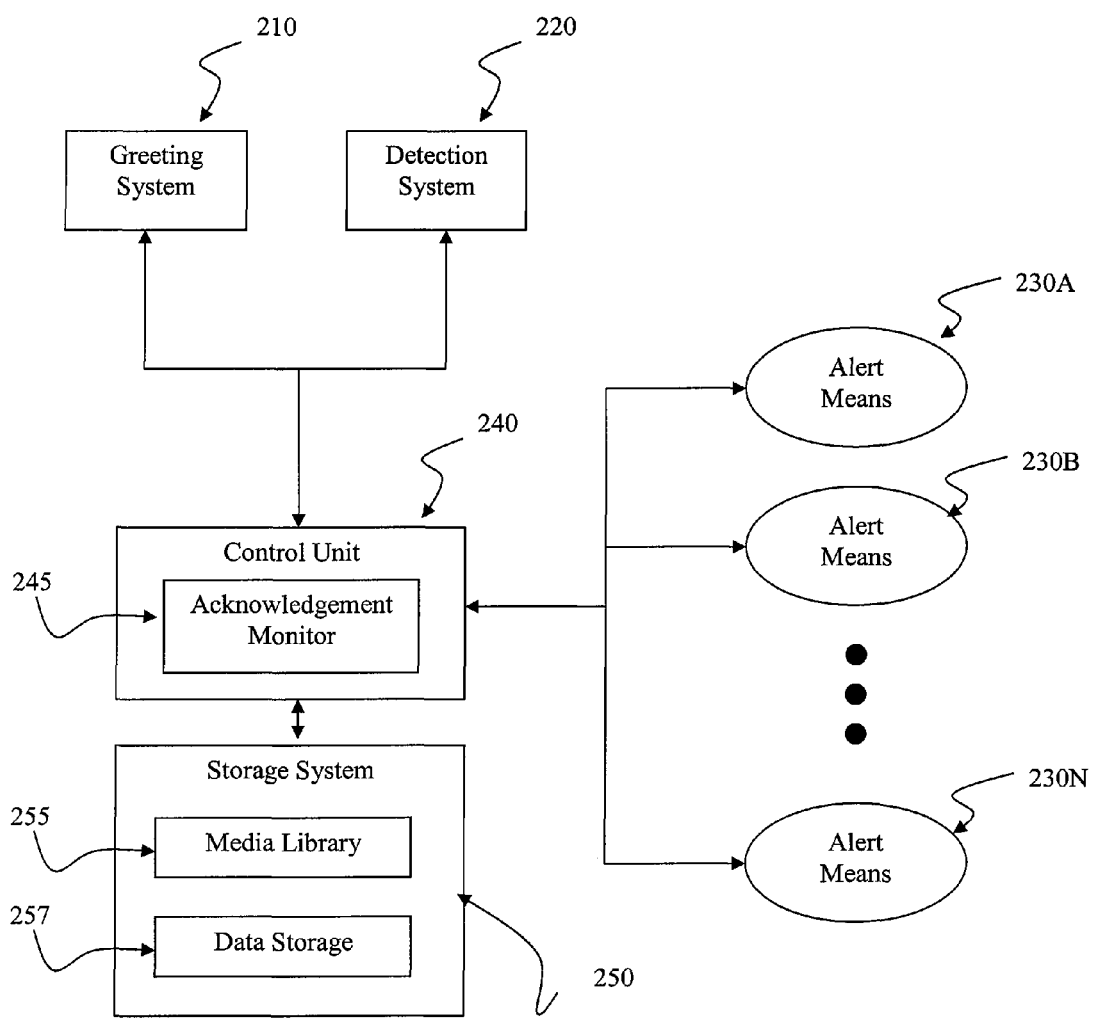
FIG. 2 is a block diagram of a system for notifying greeters of the arrival of a guest, in accordance with one embodiment of the present invention.

FIG. 2 is a block diagram of a virtual receptionist system 200 for notifying greeters of the arrival of a guest, in accordance with one embodiment of the present invention. The system 200 is capable of sensing activity in an area (e.g., lobby area) and communicating with identified personnel through a collection of devices to provide greetings and notifications that a guest has arrived.

The system 200 includes a detection system 220 for determining that a guest has arrived. In particular, the detection system is able to make the determination without any active participation from the guest. In one embodiment, detection system 220 implements the method outlined in flow chart 100A to determine whether a guest has arrived. Specifically, operations 110 and 120 of flow chart 100A disclose the process for determining when a guest needing attention has entered into a space based on passive interactions of the guest with at least two means for detection.

In one embodiment, detection system 220 includes at least two means for detection that are capable of detecting the guest within a space. Detection of the guest implies that the guest has arrived (e.g., within a reception area, lobby, etc.) and is need of attention. In addition, detection system 220 includes a guest determinator coupled to the at least two means for detection. The guest determinator is capable of determining when the guest has arrived in the space based on the passive interactions of the guest with the two means for detection, as previously described in relation to FIGS. 1A and 1B The system 200 also includes a greeting system 210, which provides greetings to the guest as the guest arrives. These greetings may include a welcome message, such as one informing the guest that someone shortly will meet them, or a message providing further instructions for the guest to follow, or a message providing information, such as advertisements, announcements, etc. in embodiments of the present invention.

System 200 also includes a control unit 240 that is coupled to the greeting system 210 and detection system 220. Control unit 240 is communicatively coupled to greeting system 210, detection system 220, storage system 250, and a plurality of alert means. As such, control unit 240 is able to receive and transmit information and instructions in order to implement a virtual receptionist system.

As shown, control unit 240 is in communication with the plurality of alert means, including alert means 230A-N. Control unit 240 is capable of activating each of the alert means 230A-N, or a subset of the alert means 230A-N, when a guest is detected. In particular, each of the plurality of alert means is associated with a greeter (e.g., employee, person, etc.) that is designated to greet guests. The alert means is used to notify each of the greeters that a guest has arrived and is in need of attention.

In this way, more than one greeter can be utilized to greet guests to spread this responsibility. This enables each of the greeters to focus the majority of their time to other duties instead of solely greeting guests. As a result, faster greeting response times can be achieved, as well as ensuring that backup greeters are available to greet guests should any greeter be unable to perform the task.

Control unit 240 also includes an acknowledgement monitor 245 for determining whether any greeter has acknowledged a corresponding alert means. In particular, when any greeter provides an acknowledgment, this indicates that the greeter is taking the responsibility to greet the waiting guest. As such, once the acknowledgment is detected, the control unit 240 is capable of de-activating each of the alert means 230A-N. De-activation indicates to the remaining greeters that the guest is being greeted. In addition, a message can be provided by control unit 240 indicating that the guest is being greeted by one of the greeters. As such, the remaining greeters can return to their work.

System 200 also includes a storage system 250 for storing data. In particular, storage system includes a media library 255. Information stored within the media library 255 is used to provide information to the guest under various scenarios, in embodiments of the present invention. For instance, information in the media library is accessed by control unit 240 and sent to greeting system 210 for the benefit of the guest. That is, when a new guest is detected, a greeting message stored in media library 255 may be provided to the guest. The greeting message may include one or more of a combination of various media, including visual, audio, tactile, etc. In addition, media library 255 stores messages that provide instructions to the guest, such as asking the guest to wait for a greeter, or other instructions informing the guest to walk to the back offices if no greeter is available. Still other information available to the guest stored in media library 255 includes access to standby video or audio programs that are played while the guest is waiting. In still another embodiment, information in the media library 255 includes advertisements that are displayed to the guest after their arrival.

Figure 3:
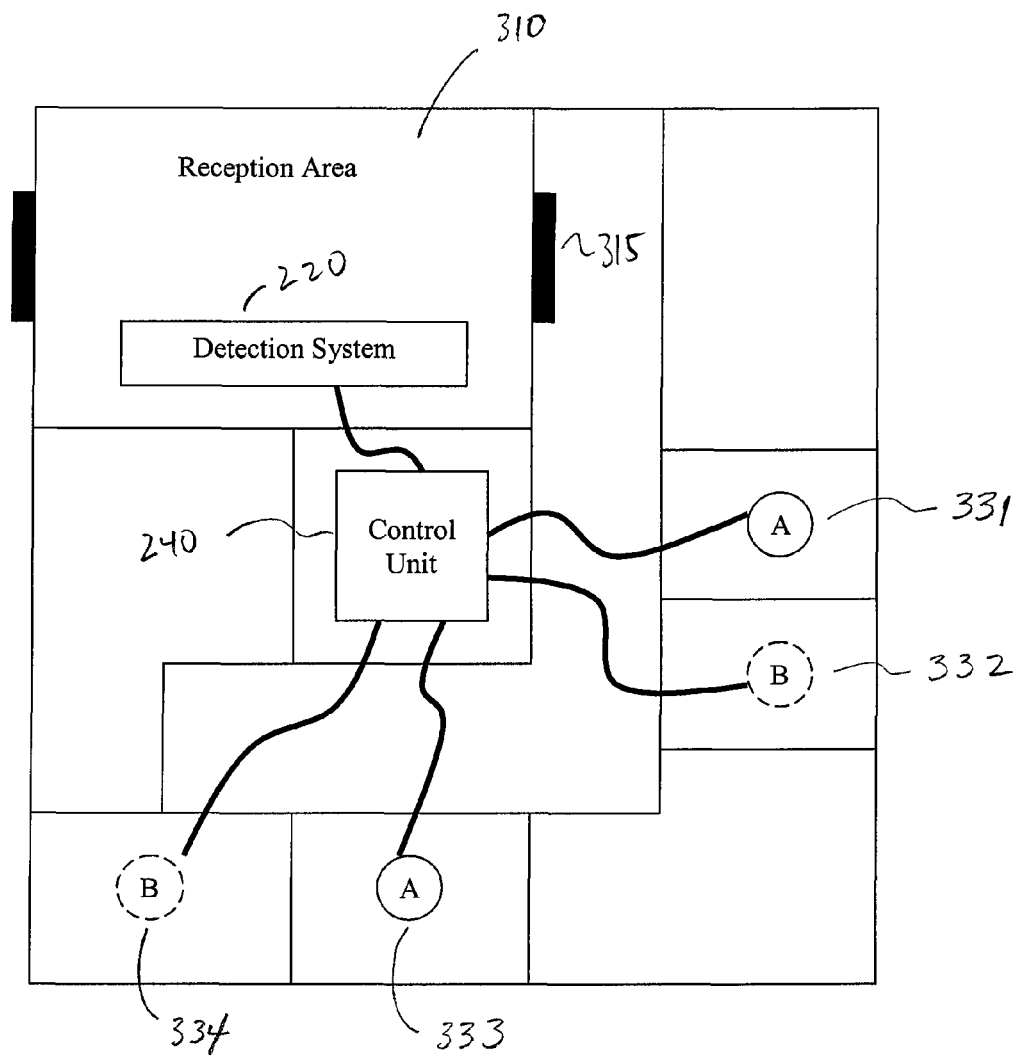
FIG. 3 is an illustration of an environment in which the system of FIG. 2 can be implemented for notifying greeters of the arrival of a guest, in accordance with one embodiment of the present invention.

FIG. 3 is an illustration of an environment in which the virtual receptionist system 200 of FIG. 2 can be implemented for notifying greeters of the arrival of a guest, in accordance with one embodiment of the present invention. As shown, FIG. 3 illustrates in general an office 300 with an unattended reception area 310 and various accessible offices through doorway 315. The virtual receptionist system 200 is able to detect when a guest has arrived in the reception area 310 and notify greeters of the arrival.

As shown in FIG. 3, the control unit 240 is communicatively coupled to detection system 220 and each of the alert means 331-334. Control unit may be located on-site or off-site, in various embodiments. For an off-site configuration, wireless, internet enabled, or any other suitable communications network can be used to communicate information between the components of virtual system 200.

Alert means 331-334 are located in the offices or spaces associated with designated greeters. Various combinations of greeters are implemented to ensure that guests are greeted. For example, in the configuration of FIG. 3, two tiers of greeters are enabled: tier A includes greeters 331 and 333, while tier B includes greeters 332 and 334. Other embodiments may include more tiers. The greeters in tier A may be first notified that a guest has arrived. If nobody in tier A acknowledges the notification, then the greeters in tiers A and B, or any suitable combination, may be further notified that a guest is waiting. These different types of notifications will be described below.

Figure 4:
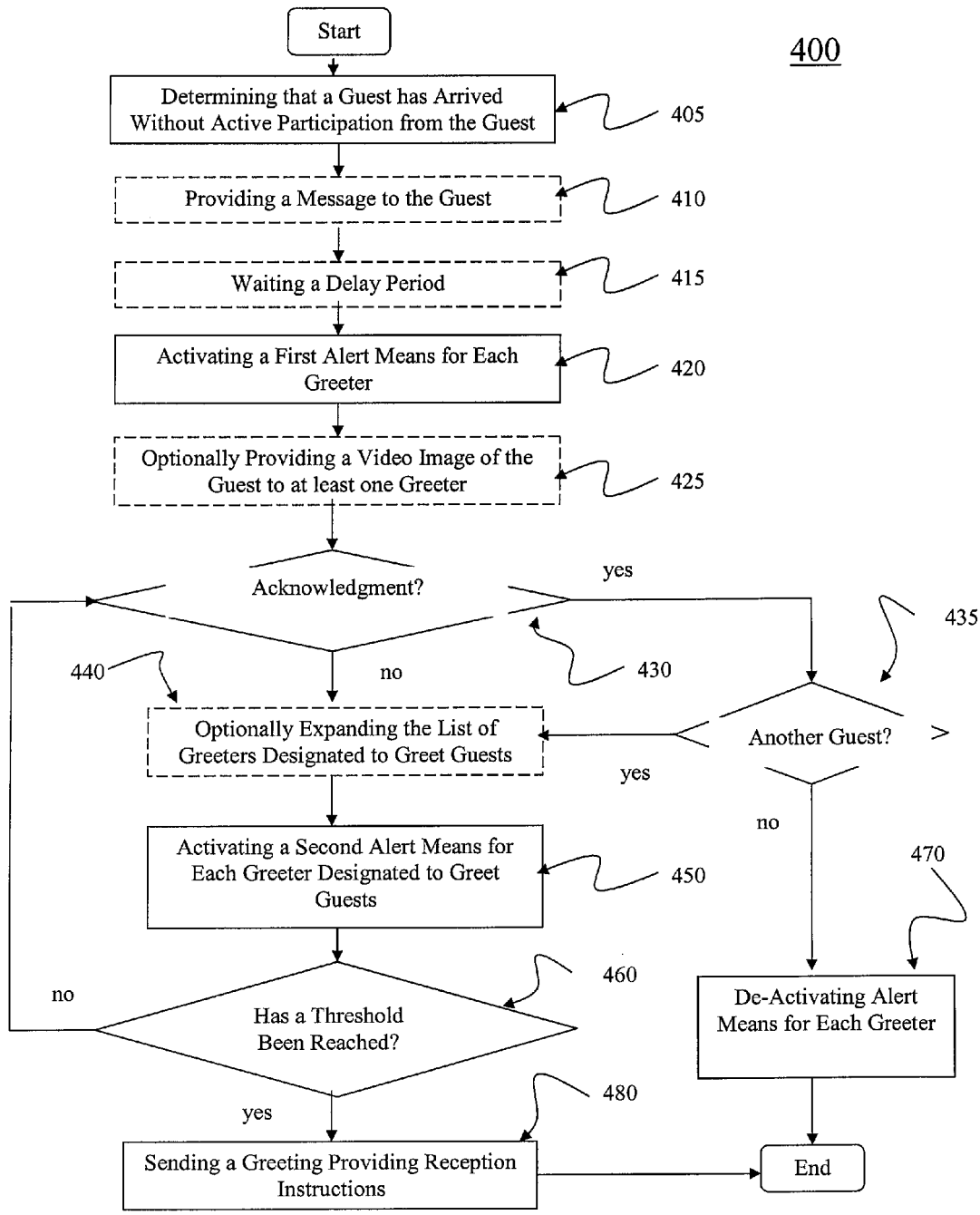
FIG. 4 is a flow diagram illustrating a method for notifying greeters of the arrival of a guest, in accordance with one embodiment of the present invention.

FIG. 4 is a flow diagram illustrating a method for notifying greeters of the arrival of a guest, in accordance with one embodiment of the present invention. The notification is implemented within a virtual receptionist system, such as system 200 described in FIG. 2, in one embodiment.

At 405, the arrival of a guest is determined. Specifically, this determination is made without any active participation from the guest. For example, detection system 220 of FIG. 2 is able to determine the arrival of a guest, through the passive interaction of the guest with two or more detection means, in one embodiment. This information regarding the arrival of a guest is provided to control unit 240 which coordinates implementation of the features of the virtual receptionist system 200, in one embodiment. In another embodiment, control unit 240 receives raw information from detection system 220 and then makes the determination of guest arrival.

At 410, once a guest is detected, an optional message is provided to the guest. The message may take any form, such as a greeting message informing the guest to wait for service, an instructional message, a message of advertisement, or any suitable message given the type of guest that is expected. For example, greeting system 210 of FIG. 2 provides the message to the guest.

At 415, optionally, a delay period is performed. The delay period is for purposes of giving the guest time to acclimate to their environment. Since the guest is not immediately received by a live person, he or she may need some time to understand just what is the proper procedure to follow. In addition, this delay period may be necessary for the guest to view the provided message (e.g., greeting, advertisements, etc.).

At 420, a first alert means is activated for each greeter in a plurality of greeters that is designated to greet guests. The first alert means notifies each greeter that a guest has arrived and is in need of attention from one of the greeters. For example, control unit 240 of FIG. 2 is capable of activating the first alert means associated with each of the greeters.

In the present embodiment, the first alert means is provided to a subset of the plurality of greeters. In that way, not all the greeters need be notified so that they may continue their work without the interruption of an alert. Embodiments of the present invention are well suited to providing the first alert means to any combination of greeters to flexibly adapt to different business environments. For example, in larger offices, the first alert means can be provided to a subset of the plurality of greeters. In smaller offices, the first alert means can be provided to each of the plurality of greeters.

In one embodiment, the first alert means includes a pager device that is communicatively coupled to a control unit (e.g., control unit 240) implementing the virtual receptionist features. The pager device may be coupled through a wired or wireless network, or any other suitable network.

It is envisioned that the pager device is implemented through various configurations. Some examples are provided as follows in embodiments of the present invention: a wired light shaped in a dome that is mounted on a greeter's desk, a wireless dome-light mounted on a greeter's desk, a wireless pager supported by a telephone paging system attached to a greeter's physical body, etc.

In the example of a dome-light, the pager device can include a bright light, and an acknowledgment button. In one case, the bright light and the acknowledgement button are combined into one component. Upon the determination that a guest has arrived, the light in the dome is activated, or lit, as a first alert means, to indicate that a guest is awaiting attention. The light remains lit until any greeter has acknowledged their corresponding first alert means. It is envisioned that the dome light may be used in other ways to provide a first alert means. Any combination of light intensity, light color, frequency, and pattern of blinking, etc. may be used to provide a first alert means, as well as other messages. For example, a blinking light, or a light that blinks a number of times, and then remains lit, etc. may be used to indicate the first alert means.

The acknowledgement button notifies the virtual receptionist system that one greeter has acknowledged the arrival of the guest and will accept the responsibility to meet the guest. That is, the acknowledgment button acts as a "I got it" button. For example, when the light and the acknowledgment button are combined, pressing the dome-light indicates that the greeter has accepted the responsibility to greet the guest. In one embodiment, the light immediately turns off for that greeter. In the pager example, the pager may include an acknowledgment button that when activated indicates that the guest will be greeted.

In other embodiments, the first alert means is implemented through a pop-up window or other visible notification on a computer or mobile computing device (e.g., personal digital assistant (PDA)). For example, a greeter may be notified through a pop-up window on his or her display that is coupled to a local or remote computing device (e.g., stand-alone computer, shared computing resource, server, etc.). The pop-up window appears unobtrusively so that the greeter is not unduly disturbed, and remains visible until any greeter has acknowledged their corresponding first alert means. An acknowledgment button, separate or integrated with the pop-up window, is also provided to allow the greeter to acknowledge the guest and provide further notification that he or she will greet the guest. In another example, the pop-up window appears on the greeter's mobile device (e.g., cellular phone, PDA, etc.). The pop-up window may be combined with any other notification means, such as a vibrating means, or lighting means on the mobile device to provide additional first alert means.

Notification to a plurality of greeters may be provided using a combination of notification means, some of which were described above, in embodiments of the present invention. For example, notification that a guest has arrived may be presented to one greeter through a pop-up window, and a text-message to another greeter's mobile phone. In still other embodiments, a combination of notification means may be provided to a single greeter. For example, notification that a guest has arrived may be presented to one greeter through a pop-up window at that greeter's desk, and additionally through a text-message to that greeter's mobile phone.

At 425, an optional video image of the guest is provided to at least one greeter. Specifically, the virtual receptionist system 200 is capable of providing a static or live image of the guest to one or more greeters. In that way, it is possible for the greeters to determine the identity of the guest. The greeters might confer with one another to possibly select the proper greeter to greet the guest.

At 430, an operation is performed to determine whether any greeter has acknowledged their first alert means. That is, at 430, it is determined if the guest will be greeted.

If there has been an acknowledgement at 430, then the process proceeds to step 435 where it is determined whether another guest has arrived. If no other guest is detected, then the process proceeds to step 470 where the alert means is de-activated for each greeter, since the guest will be greeted and the process ends.

However, if no acknowledgment is received at 430 after a period of time, the process proceeds to 440, where the set of greeters to be notified that a guest has arrived is optionally expanded. That is, after a period of time that the guest is waiting, if no greeter has acknowledged the notification that a guest has arrived, more greeters may be notified that a guest is waiting. In this way, a tiered response may be implemented that expands the set of greeters the longer the guest is waiting.

At 450, a second alert means is activated for each greeter in the set of greeters selected to greet the guest. For example, information that the guest has been waiting for a period of time without any assistance is delivered to the set of greeters using the second alert means. In this way, the second alert means is able to convey a sense of urgency to the greeters, so that the guest need not wait any longer than necessary. For instance, in the dome-light example, the second alert means may be implemented through a brighter light, or a higher frequency of blinking lights, any other suitable blinking frequency, pattern of blinking, color of lights, etc., or any combination thereof.

The second alert means may also indicate that another guest has arrived. That is, from 435, once it is determined that another guest has arrived, even after an acknowledgment has been received, the operation of 440 is performed. In one embodiment, the same second alert means is used to indicate that no acknowledgment has been received, or that another guest has arrived. In another embodiment, different alert means, a third alert means, can be used to indicate that either no acknowledgment has been received or that another guest has arrived by varying the blinking frequency, pattern of blinking, or color of lights, etc. as previously described.

At 460, it is determined whether a threshold has been reached. Specifically, this step aids in identifying whether the guest has waited too long, and that a greeter most likely is not available to greet the guest. This may be implemented through any number of means, for example, the threshold may be a timer that when exceeded indicates the guest has waited too long, or the threshold may be the number of times the process in 400 has looped through operation 430.

If no threshold has been reached, then the process returns to 430 to see if any acknowledgment has been reached that was stimulated from the delivery of the first alert means, or the second alert means. In addition, as the process loops through 440 and 450, the set of greeters may be expanded each time, and the type of alert means may be changed to indicate additional urgency. As such, any acknowledgment may be in response to either the first, second, or subsequent alert means associated with the multi-tiered approach to expanding the set of greeters.

On the other hand, if a threshold has been reached, then at 480 a greeting is sent to the guest. Specifically, the control unit 240 may send an additional greeting to the greeting system 210 that provides further instructions to the guest. For instance, the instructions may indicate that the guest should proceed to the back offices to find any employee who can assist them. In another embodiment, additional information may be requested from the guest. That is, a self-help terminal or kiosk (e.g., touch screen display or audio transceiver) may be available to prompt the guest for additional information, such as name, and who the guest is intending to visit.

Various Configurations of Providing Notification

Various scenarios and configurations are envisioned for implementation of a notification system and method in a virtual receptionist system. For instance, configurations can include pagers, pop-up windows, audible messages, signals, etc. or any combination of these for providing notification, as will be described below.

a. Immediate Notification with Pagers

In this example, an office includes a single lobby, which accesses a back office in which employees work. Typically, the office would be a smaller business with infrequent guests. The number of greeters designed to greet guests can be varied, but in one case, all the employees of the office are designated as greeters and each employee is expected to share in reception duties. As such, each employee has a pager device at their work station, or in their office, or as a mobile device that can be worn in embodiments of the invention. For example, the pager device could be a wired pager, or a wireless pager, or a traditional telephone pager device. For purposes of illustration, each of the employees is associated with a dome-light pager device located at their corresponding desk.

When a guest is detected, each of the pagers is immediately illuminated as a first alert means. That is, there is no delay in reporting that a guest has arrived. A greeting message may or may not be played. This is possible in a small office, since a greeter would immediately receive the guest. In one case, the light is illuminated and remains on. In another case, the light is blinked one or more times to help attract the employee's attention, before remaining on.

All of the pagers remain illuminated until an acknowledgment is received. When an acknowledgment is received, all of the pagers turn off, signaling that the guest has been claimed.

b. Delayed Notification of Multiple Guests with Pagers

In this example, the same office configuration described above can be used to illustrate a delayed notification configuration. In this example, a greeting message is played that may include additional information, such as an introduction to the company, or a marketing advertisement. As before, all the employees of the office are designated as greeters and each employee is expected to share in reception duties. As such, for purposes of illustration, each employee is associated with a dome-light pager located at their corresponding desk.

In this example, the greeting message is of a longer duration, and is played upon the detection of the guest. It would be beneficial for the captured guest to view the entire greeting message, such as the 1-2 minute introduction to the company. As such, notification to the employees that a guest has arrived is delayed for a period of time, in one embodiment. The delay period is designed so that the guest has a chance to view the entire greeting message. For example, after a one-minute delay, all of the pagers blink a predetermined number of times (e.g., twice), and then remain lit, or any other pattern combination can be used as a first alert means to indicate the presence of a guest.

In addition, if another guest is detected in the lobby while the pagers are lit, the virtual receptionist system will again delay any further notification while the second guest is engaged with the greeting message, in another embodiment. To indicate the second guest, the second alert means is activated. For example, all of the lights on the pagers will blink once more in an identifiable pattern, and then remain on, in one embodiment. A different color may also be used to indicate a second guest has arrived, in another embodiment.

As additional guests enter, the process is repeated. However, in one embodiment, the timing of the notification to the greeters may be modified so that greeters are not constantly interrupted with notifications. For instance, after a certain number of guests, it may be assumed that a greeter acknowledging and going out to greet the guests will also be able to receive the new guests. As such, if a certain number of detected guests is exceeded for a period, notifications are suspended for a time, even if new guests are arriving. For example, the activation of an alert is delayed if the total number of alerts in a period has exceeded a threshold.

c. Immediate Notification with Pop-Up Window

In this example, the same office configuration described above can be used to illustrate a notification configuration using pop-up windows. As before, all the employees are designated as greeters and each employee is expected to share in reception duties. Also, each of the employees is associated with a display that is coupled to a computer system. Each of the computers is communicatively coupled to the virtual receptionist system.

In this example, notification is provided through a pop-up window. When a guest is detected, a greeting message is played for the benefit of the guest. In addition, notification is immediately provided to the greeters that a guest has arrived. For example, a pop-up window may appear unobtrusively on displays associated with the greeters, similar to the window that appears that is associated with notification of an instant message or an e-mail. The pop-up window informs the greeter that a guest is waiting.

When a greeter is ready to greet the guest, he or she provides such acknowledgment. For instance, the greeter may click an "I Got It" button on the pop-up window. In this case, the pop-up window for the greeter providing the acknowledgment disappears. For all other greeters, a new pop-up window appears, or their previous pop-up window changes, to provide information as to the status of the notification. For example, the new pop-up may appear for a few seconds stating that a particular greeter has gone to greet the guest. In this case, by providing the name of the greeter, this may help employees share the load through peer pressure, since employees who infrequently greet guests can be identified.

d. Immediate Notification with Mixed Devices

In this example, the same office configuration described above can be used to illustrate a notification configuration using mixed devices. As before, all the employees are designated as greeters and each employee is expected to share in reception duties. Some employees are sitting at desks and can be associated with a display that is coupled to a computer system. Each of these computers is communicatively coupled to the virtual receptionist system through a network. In addition, other employees are not always in front of a computer, and may be fitted with a mobile pager device, or a lighted pager device in their work area.

When a guest is detected, each of the pagers is activated. In the case of a dome-light pager, as described previously, the pager light can be illuminated according a pattern indicating a first alert means. These pager lights remain illuminated until a greeter acknowledges their corresponding alert means.

In addition, each of the pop-up windows are displayed on the screens of associated greeters, as previously described. These pop-up windows indicate that a guest has arrived and remain on the screen until an acknowledgment has been received.

Once an acknowledgment is received, all of the pagers turn off, and all of the pop-up windows change to indicate that the guest has been greeted. When the greeter is known, the pop-up window may indicate the name of the greeter, as previously described. If the greeter is unknown, as in the case when the greeter uses a pager, the pop-up window may just indicate that the guest is being greeted.

d. Double Lobby with Pop-Up Window

In this example, the office configuration includes two separate lobbies, each of which leads to the same back office and is used to illustrate a notification configuration using pop-up windows. For instance, the set of offices may be in the middle of a building. Two entrances service the building and the set of offices. For instance, a front lobby is in the front of the building, and a back lobby is located at the back of the building. Each lobby can be fitted with a detection system and greeting system, all of which are coupled to a control unit of a virtual receptionist system.

In this scenario, not all employees need be designated as greeters. As such, a tiered approach may be implemented in determining the set of greeters expected to share in reception duties. Employees in the set that is designated to greet guests may be sitting at desks. As such, for purposes of illustration, each greeter is associated with a display that is coupled to a computer system that is also communicatively coupled to the virtual receptionist system through a network. Other embodiments are well suited to a mix of alert devices for purposes of providing alert means of notification.

When a guest is detected, it is readily determined in which lobby the guest has arrived, depending on which detection system has made the detection, for example. Immediately a greeting message is played, as described previously.

Thereafter, a notification is provided to the set of greeters designated to greet guests. In one embodiment, one set of greeters is designated to greet guests in the front lobby, while a different set of greeters is designated to greet guests in the back lobby. In another embodiment, all greeters are designed to greet both guests in the front lobby and the back lobby. As such, only the set of greeters that is designated to greet the incoming guest is provided notification of the arrival of the guest, and in which lobby the guest is waiting.

As described previously, the pop-up window remains visible until an acknowledgment is received. Once a greeter provides acknowledgment, all of notification pop-up windows are removed, and another pop-up window is displayed indicating the name of the greeter who has gone to greet the guest. If there are other guests detected, the pop-up window remains visible, possibly indicating that multiple guests are in the lobby, and in which lobby or lobbies the guests are located.

Notification in a Retail Environment

Figure 5:
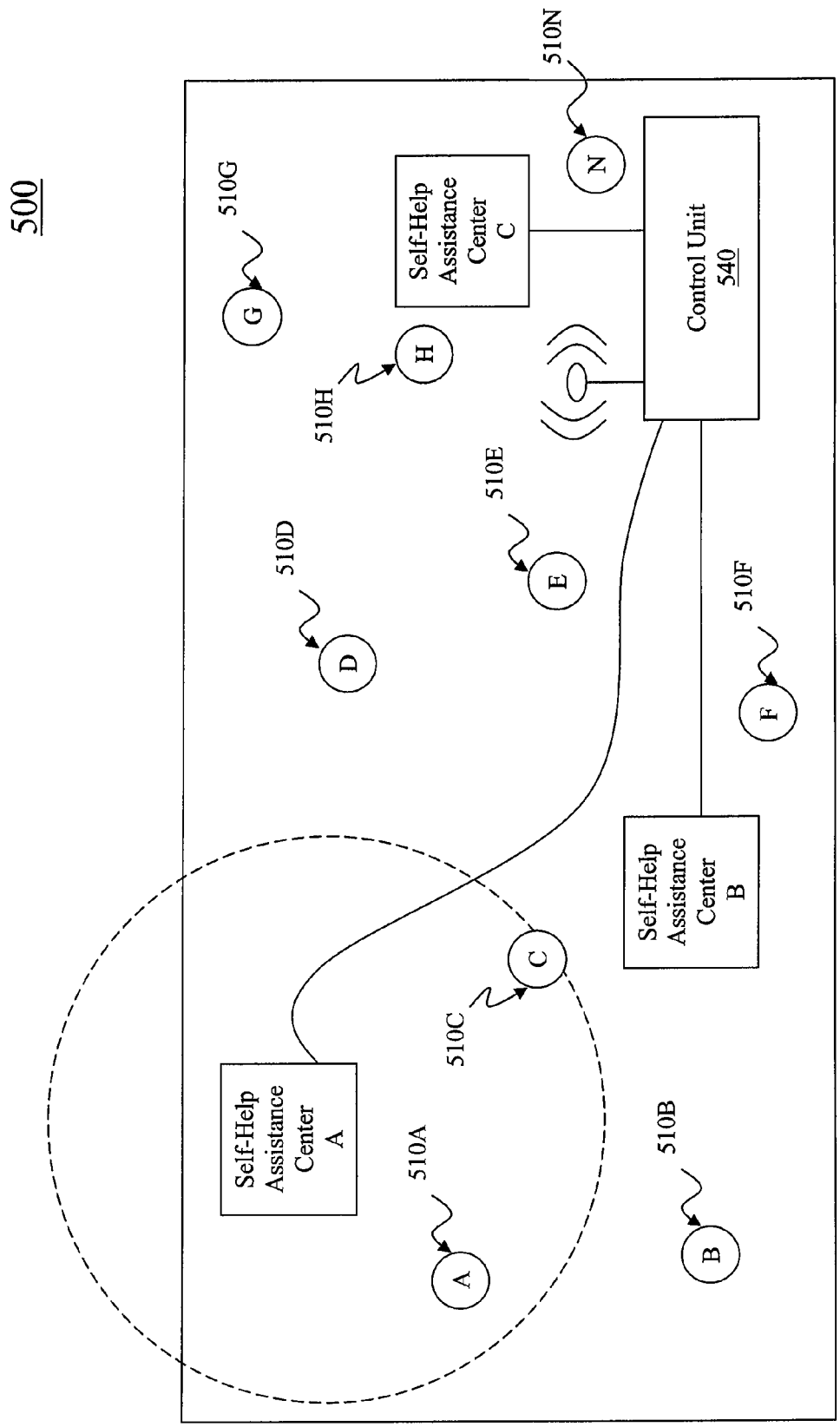
FIG. 5 is an illustration of an environment in which the method of FIG. 6 can be implemented for notifying customer service representatives of a customer seeking assistance, in accordance with one embodiment of the present invention.
Figure 6:
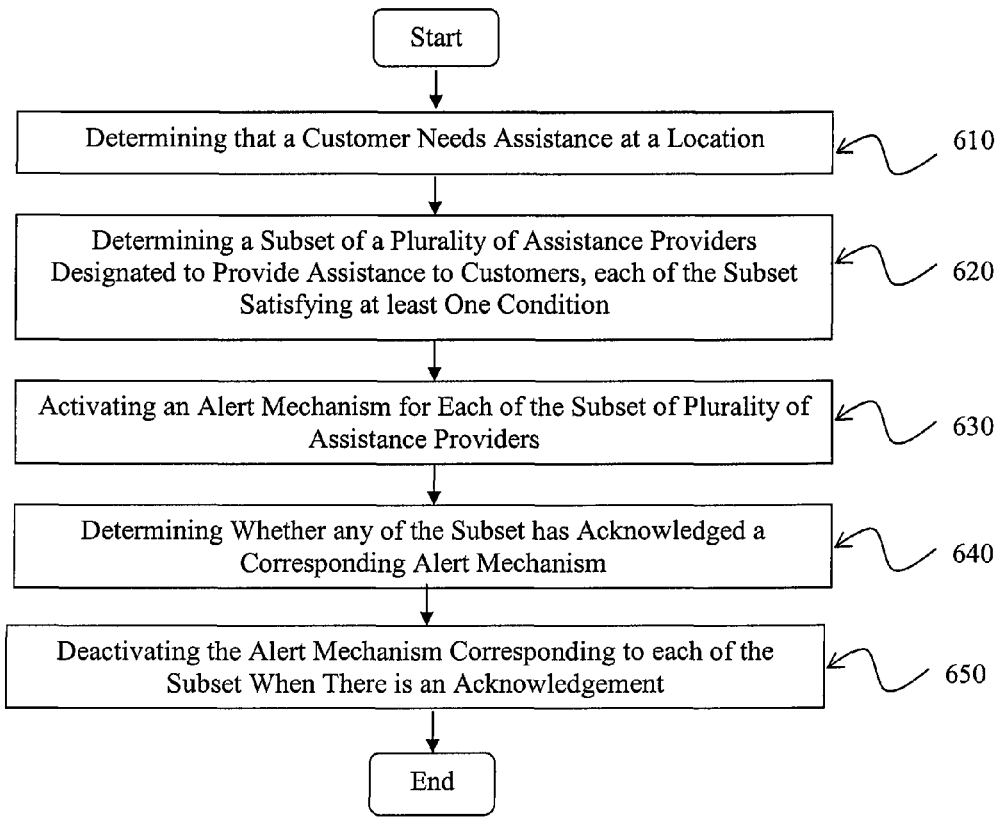
FIG. 6 is flow diagram illustrating a method for notifying customer service representatives of a customer seeking assistance, in accordance with one embodiment of the present invention.

FIGS. 5 and 6 in combination illustrate a method and system for providing notification that a customer is requiring assistance, in accordance with embodiments of the present invention. Specifically, the methods for detection and notification provided in FIGS. 1-4 can be modified to provide notification in a retail environment.

FIG. 5 is an illustration of a retail environment 500 in which notification is provided that a customer is seeking assistance, in accordance with one embodiment of the present invention. For illustration purposes, the retail environment is a warehouse in which many goods are available, but service representatives are scattered throughout the warehouse.

As shown in FIG. 5, the system for notification includes one or more self-help assistance centers, such as assistance centers A, B and C. Each of the assistance centers A-C are situated in a different but identifiable location. For illustration purposes, the assistance centers A-C are self-help kiosks in which a customer can actively request assistance. In one case, the customer picks up a telephone to talk to an automated request system (e.g., a phone tree that determines which department the customer seeks assistance, etc.). Also, the kiosk may include a request button that the customer presses to request assistance. In addition, the kiosk may include an interactive display screen.

Each of the self-help assistance centers A-C are communicatively coupled to the control unit 540. The operation of the notification system is controlled by control unit 540. Specifically, control unit 540 is able to determine from which center A-C was a request made, and correspondingly at which assistance center A-C the customer is located. In that way, control unit 540 is able to notify potential employees of the need to provide assistance, as will be described below.

In addition, the control unit 540 is able to activate an alert means for employees that are selected to possibly greet the customer. In addition, the control unit 540 is able to determine if an employee acknowledges any corresponding alert means. Also, the control unit 540 is able to de-activate alerts when an acknowledgment is received.

As shown in FIG. 5, a plurality of employees A-N are located throughout the retail environment 600. In embodiments of the present invention, any number of employees can be supported in the notification system. Though shown in two dimensions in FIG. 5, the employees can be located in three dimensions. For instance, the employees can be located on one or more levels of a retail store.

Each of the employees is associated with a mobile notification device 510A-H . . . and on up to 510N, or 510A-N. Each mobile device could be represented by a pager, or PDA, or mobile cell phone that acts to provide notification or an alert means. Each notification device is communicatively coupled to the control unit 540. As shown in FIG. 5, the control unit is wirelessly coupled to each of the notification devices 510A-N. The notification devices 510A-N can provide notification that a customer needs assistance, and at which self-help assistance center the customer is waiting. For example, the notification device may vibrate, or illuminate lights, make an audible sound, or any other suitable notification means to indicate that a customer needs assistance. In addition, a message may be provided that indicates at which assistance center A-N, the customer is waiting. For example, the message may be provided through a text message, audible message, or any message means that provides the customer's location.

FIG. 6 is flow diagram 600 illustrating a method for notifying customer service representatives of a customer seeking assistance, in accordance with one embodiment of the present invention. The method can be implemented within a retail environment in which customers take an affirmative action to request assistance from a customer representative, or an assistance provider.

At 610, the present embodiment determines that a customer needs assistance at a location. For instance, using the example in FIG. 5 of a retail store, a customer may actively request assistance by interactions with one of the self-help assistance centers A-C. For purposes of illustrating the implementation of flow diagram 600, a customer makes a request for assistance from assistance center A. Since the request is made from a known location, the general location of the customer is also known.

At 620, a subset of a plurality of assistance providers designated to provide assistance to customers is determined. In this case, each of the subset satisfies at least one condition. For example, using the illustration of FIG. 5, the plurality of assistance providers includes employees associated with notification devices 510A-N. It is assumed that all employees can provide assistance. However, since the location of the customer requiring assistance is known, not all of the employees need to be notified. As such, one condition, might be that only those closest to the customer will be notified. The locations of each of the employees can be tracked using any location tracking means available. The location tracking is able to determine the location of each employee in the retail store, including which level the employee is located. The number may be variable, and is 3, in one embodiment. As such, under this condition, and using the example above, employees A, B and C are included in the subset and each would be notified that a customer needs assistance.

Another condition may select employees that are within the department from which the customer is seeking assistance. For instance, the customer may provide information indicating that assistance is needed in the paint department. As such, only those employees in that department would be notified. For example, employees A, D, F and H each are associated with the paint department and are all included in the subset. As such, notification would be provided to each of those employees. Other embodiments are well suited to implementing other conditions suitable for selecting employees of a subset to assist the customer.

At 630, an alert is activated for each of the subset. For example, the alert may be a mobile pager device that is able to notify the employee that a customer needs assistance, such as through a vibrator, lights, sound, or a combination. In addition, the pager device may receive a text message indicating where the customer is located.

At 640, it is determined whether any of the subset has acknowledged a corresponding notification alert. This determination is analogous to the 430 of FIG. 4. if an acknowledgment is received, then at 650, the notifications for the employees in the subset are de-activated, since an employee is willing to provide assistance to the customer.

On the other hand, the process of FIG. 4 can be implemented when no one in the subset of assistance providers has provided an acknowledgment. As such, an expanded subset of assistance providers is determined. The expanded subset satisfies a second condition. For example, the second condition may look for the six employees that are located closest to the customer. Thereafter, another alert may be activated for each of the expanded subset to indicate an urgency in providing assistance to the customer.

Accordingly, embodiments of the present invention provide for a virtual receptionist system that automatically determines when an object, such as a guest, has arrived and provides notification of the guest arrival, without any active participation on the part of the guest.

While the methods of embodiments illustrated in 1A, 4, and 6 show specific sequences and quantity of operations, the present invention is suitable to alternative embodiments. For example, not all the operations provided for in the methods presented above are required for the present invention. Furthermore, additional operations can be added to the operations presented in the present embodiments. Likewise the sequences of operations can be modified depending upon the application.

A method and system for notification in a virtual receptionist system, is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed:

1. A method of notification, comprising:
    determining that a guest has arrived, wherein said determining is made without active participation from said guest;
    activating an alert for each greeter in a plurality of greeters designated to greet guests;
    determining whether any greeter has acknowledged a corresponding alert; and
    de-activating alerts corresponding to each greeter when an acknowledgement has been determined.

2. The method of claim 1, wherein said activating an alert mechanism comprises:
    activating a first alert for each greeter designated to greet guests;
    determining that no greeter has acknowledged a corresponding first alert; and
    activating a second alert for each greeter, said second alert indicating an urgency in greeting said guest.

3. The method of claim 1, wherein said activating an alert comprises:
    activating a first alert for each greeter;
    determining that no greeter has acknowledged a corresponding first alert;
    activating a second alert for each greeter, said second alert indicating an urgency in greeting said guest;
    determining that no greeter has acknowledged a corresponding second alert; and
    sending another greeting to said guest providing reception instructions.

4. The method of claim 1, where in said activating an alert comprises:
    activating a first alert for each greeter;
    determining that no greeter has acknowledged a corresponding first alert;
    determining that another guest has arrived, wherein said determination is made without active participation from said another guest; and
    activating a second alert for each greeter, said second alert mechanism indicating that multiple guests are waiting for attention.

5. The method of claim 1, wherein said activating an alert comprises:
    waiting for a period of time before performing said activating said alert; and
    providing a message for said guest during said period of time.

6. The method of claim 1, wherein said activating an alert comprises:
    activating an alert button for at least one greeter that remains activated until any greeter acknowledges and deactivates their corresponding alert.

7. The method of claim 1, wherein said activating an alert comprises:
    activating a pop-up message window for at least one greeter that remains visible on a display until any greeter acknowledges and deactivates their corresponding alert mechanism.

8. The method of claim 1, wherein said notifying at least one greeter comprises:
    activating a pager mechanism for at least one greeter that remains activated until any greeter acknowledges and deactivates their corresponding alert mechanism.

9. The method of claim 1, wherein said determining that a guest has arrived comprises:
    providing at least two means for detection within a space; and
    determining that said guest has arrived within said space based on passive interactions of said guest with said at least two detection means.

10. The method of claim 1, further comprising:
    capturing a video image of said guest; and
    sending said video image of said guest to at least one greeter.

11. The method of claim 1, wherein said activating an alert comprises:
  delaying said activating an alert if a total number of alerts in a period has exceeded a threshold.

12. A method of notification, comprising:
  determining that a customer needs assistance at a location;
  determining a subset of a plurality of assistance providers designated to provide assistance to customers, each of said subset satisfying at least one condition;
  activating an alert for each of said subset;
  determining whether any of said subset has acknowledged a corresponding alert; and
  deactivating alerts corresponding to each of said subset when there is an acknowledgement.

13. The method of claim 12, further comprising:
  determining an expanded subset of said plurality of assistance providers when no assistance provider in said subset has acknowledged a corresponding alert, each of said expanded subset satisfying at least one other condition; and
  activating another alert for each of said expanded subset indicating an urgency in providing assistance to said customer.

14. The method of claim 12, wherein said determining that a customer needs assistance comprises:
  receiving a signal indicating that said customer has activated a request mechanism at a self-help kiosk at said location.

15. The method of claim 12, wherein said determining a subset comprises:
  setting said condition as a distance threshold, such that assistance providers in said subset are located within said distance threshold from said customer's location.

16. The method of claim 12, wherein said activating an alert mechanism comprises:
  activating a message in a mobile pager for each of said subset.

17. A system for notification, comprising:
  a detection system for determining that a guest has arrived, wherein said determining is made without active participation from said guest;
  an alert means for each greeter designated to greet guests;
  a control unit coupled to said detection system and each of said alert means, said control unit for activating an alert means for each greeter designated to greet guests when a guest has arrived;
  an acknowledgment monitor coupled to said control unit for determining whether any greeter has acknowledged a corresponding alert means;
  wherein said control unit is capable of de-activating alert means corresponding to each greeter when an acknowledgement has been determined.

18. The system of claim 17, wherein said detection system comprises:
  at least two means for detection for detecting said guest within a space; and
  a guest determinator coupled to said at least two detectors for determining when said guest has entered said space based on interactions of said guest with said at least two means for detecting.

19. The system of claim 17, wherein said alert means comprises:
  an alert button that remains activated until any greeter acknowledges and deactivates their corresponding alert means;
  wherein said alert button provides a second message when no greeter acknowledges and de-activates their corresponding alert means; and
  wherein said alert button provides a third message when another guest has arrived.

20. The system of claim 17, further comprising:
  a greeting system coupled to said detection system for providing a greeting to said guest.

* * * * *